United States Patent
Park et al.

(10) Patent No.: US 12,497,639 B2
(45) Date of Patent: Dec. 16, 2025

(54) METHOD FOR PREPARING KESTOSE-CONTAINING FRUCTOOLIGOSACCHARIDES

(71) Applicant: SAMYANG CORPORATION, Seoul (KR)

(72) Inventors: Ji Won Park, Seongnam-si (KR); Go-Eun Kim, Gwangju-si (KR); Choong Woo Nam, Seoul (KR); Chong Jin Park, Seoul (KR); Jae-Kyung Yang, Suwon-si (KR); Jung Sook Han, Anyang-si (KR)

(73) Assignee: SAMYANG CORPORATION, Seoul (KR)

( * ) Notice: Subject to any disclaimer, the term of this patent is extended or adjusted under 35 U.S.C. 154(b) by 650 days.

(21) Appl. No.: 17/772,721

(22) PCT Filed: Oct. 30, 2020

(86) PCT No.: PCT/KR2020/015097
§ 371 (c)(1),
(2) Date: Apr. 28, 2022

(87) PCT Pub. No.: WO2021/086141
PCT Pub. Date: May 6, 2021

(65) Prior Publication Data
US 2022/0411838 A1    Dec. 29, 2022

(30) Foreign Application Priority Data
Oct. 31, 2019   (KR) .................. 10-2019-0138215

(51) Int. Cl.
*C12P 19/04*   (2006.01)
*B01D 15/18*   (2006.01)
(Continued)

(52) U.S. Cl.
CPC ............ *C12P 19/04* (2013.01); *B01D 15/185* (2013.01); *B01D 15/362* (2013.01);
(Continued)

(58) Field of Classification Search
None
See application file for complete search history.

(56) References Cited

U.S. PATENT DOCUMENTS

| 6,479,657 B1 * | 11/2002 | Nishizawa ................ C30B 7/00 435/74 |
| 7,655,449 B2 | 2/2010 | Nakamura et al. |
| 2008/0187970 A1 * | 8/2008 | Nakamura ..... C12Y 302/01026 435/320.1 |

FOREIGN PATENT DOCUMENTS

| CN | 1793385 | 6/2006 |
| CN | 103333934 | 10/2013 |

(Continued)

OTHER PUBLICATIONS

Nobre C. et al., "Strategies for the production of high-content fructo-oligosaccharides through the removal of small saccharides by co-culture or successive fermentation with yeast", Carbohydrate Polymers, GB, (Jan. 1, 2016), vol. 136, doi:10.1016/j.carbpol.2015.08.088, ISSN 0144-8617, pp. 274-281, XP093108151 [I] 1,2,7, 9-15 * p. 280, col. 1, par. 5-7; p. 280, col. 1, paragraph 5-paragraph 7 * , DOI: http://dx.doi.org/10.1016/j.carbpol.2015.08.088, Jan. 2016.

(Continued)

*Primary Examiner* — Erin M. Bowers
(74) *Attorney, Agent, or Firm* — LEX IP MEISTER, PLLC

(57) ABSTRACT

The present invention relates to a method of preparing kestose-containing fructooligosaccharide, and more specifi-
(Continued)

cally, a method of preparing kestose-containing fructooligosaccharide having a high content of kestose and excellent storage stability.

14 Claims, 3 Drawing Sheets

(51) Int. Cl.
  *B01D 15/36* (2006.01)
  *C12N 9/26* (2006.01)
(52) U.S. Cl.
  CPC ......... *B01D 15/363* (2013.01); *C12N 9/2431* (2013.01); *C12Y 302/01026* (2013.01)

(56) References Cited

FOREIGN PATENT DOCUMENTS

| | | |
|---|---|---|
| CN | 104781414 | 7/2015 |
| CN | 104878056 | 9/2015 |
| EP | 2899282 | 7/2015 |
| JP | 6-70075 | 9/1994 |
| JP | 2000-232878 | 8/2000 |
| JP | 2001-149100 | 6/2001 |
| JP | 3459264 | 10/2003 |
| JP | 2015-530089 | 10/2015 |
| KR | 10-2015-0056795 | 5/2015 |
| KR | 10-1628769 | 6/2016 |
| KR | 10-2018-0078065 | 7/2018 |
| KR | 10-2018-0078086 | 7/2018 |
| KR | 10-2018-0122987 | 11/2018 |
| WO | 1997-021718 | 6/1997 |

OTHER PUBLICATIONS

Nishizawa Koji et al., "Kinetic Study on Transfructosylation by .BETA.—Fructofuranosidase from Aspergillus niger ATCC 20611 and Availability of a Membrane Reactor for Fructooligosaccharide Production.", Food Science and Technology Research, CH, (Jan. 1, 2001), vol. 7, No. 1, doi:10.3136/fstr.7.39, ISSN 1344-6606, pp. 39-44, XP093108210 [A] 1-15 * p. 44, col. 1, paragraph 3; table 5 *, DOI: http://dx.doi.org/10.3136/fstr.7.39, Jan. 2001.
Kurakake Masahiro et al., "Production of Fructooligosaccharides by [beta]-Fructofuranosidases from *Aspergillus oryzae* KB", Journal of Agricultural and Food Chemistry, US, (Dec. 16, 2009), vol. 58, No. 1, doi:10.1021/jf903303w, ISSN 0021-8561, pp. 488-492, XP093108150 [A] 1-15 * p. 488, col. 1, paragraph 1-paragraph 2; table 2 *, DOI: http://dx.doi.org/10.1021/jf903303w, Dec. 16, 2009.
Suvarov Paul et al., "Cycle to cycle adaptive control of simulated moving bed chromatographic separation processes", Journal of Process Control, Oxford, GB, (Nov. 23, 2013), vol. 24, No. 2, doi:10.1016/J.JPROCONT.2013.11.001, ISSN 0959-1524, pp. 357-367, XP028632005 [A] 1-15 * p. 360, col. 2, paragraph 5—p. 361, col. 1, paragraph 2 *, DOI: http://dx.doi.org/10.1016/j.jprocont.2013.11.001, Nov. 23, 2013.
Yang Ya-Lin et al., "Preparation of High-Purity Fructo-oligosaccharides by Aspergillus japonicus [beta]-Fructofuranosidase and Successive Cultivation with Yeast", Journal of Agricultural and Food Chemistry, US, (Mar. 12, 2008), vol. 56, No. 8, doi: 10.1021/jf703586q, ISSN 0021-8561, pp. 2805-2809, XP093108214 [A] 1-15, DOI: http://dx.doi.org/10.1021/jf703586q, Mar. 12, 2008.
EPO, Extended European Search Report of the corresponding European Patent Application No. 20882874.9., dated Dec. 19, 2023.
KIPO, PCT Search Report & Written Opinion of PCT/KR2020/015097 dated Feb. 2, 2021.
Hidemasa Hidaka et al., "A Fructooligosaccharide-producing Enzyme from Aspergillus niger ATCC 20611", Agric. Biol. Chem., vol. 52, pp. 1181-1187 (1998.).
Lin Chun-mian et al., " Study on the Oxidative Decomposition of Naphthol in Supercritical Water", Chemical Reaction Engineering and Technology, vol. 16, No. 1, Mar. 2020.
Tokunaga Takahisa, "Properties and effective utilization of fructo-oligosaccharide", Food Science extra edition 1991 guide to seasonings, Aug. 8, 1991, vol. 436, pp. 84-90.
Satoshi Fujii et al., "Studies on Purification of Sugar Liquor with Ion-exchange Resin Part II. The pH-drops of sugar liquors treated with reverse system", Journal of Japan Society of Food Industry, vol. 22, No. 2, Feb. 1975.
JPO, Office Action of JP 2022-525221 dated May 9, 2023.

\* cited by examiner

[Fig. 1]
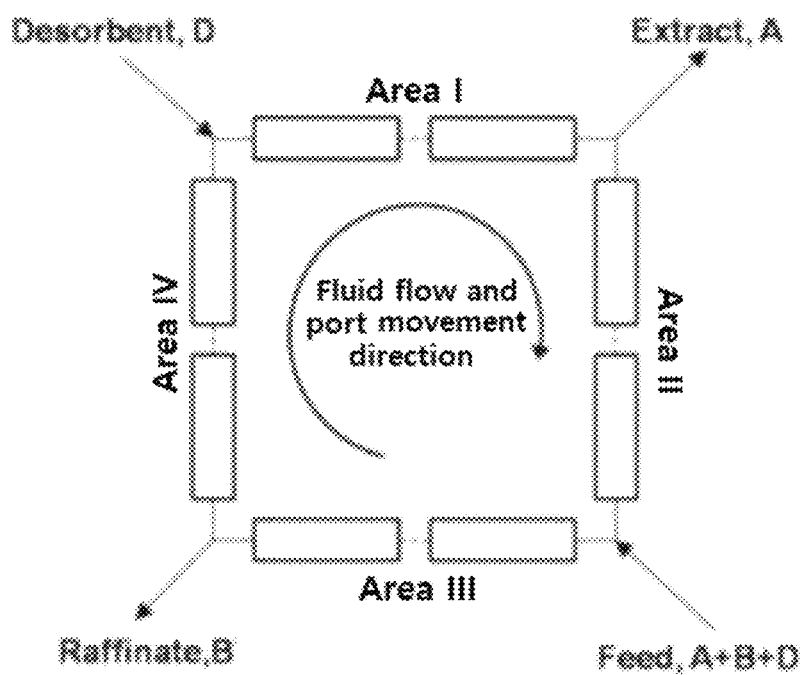

[Fig. 2]
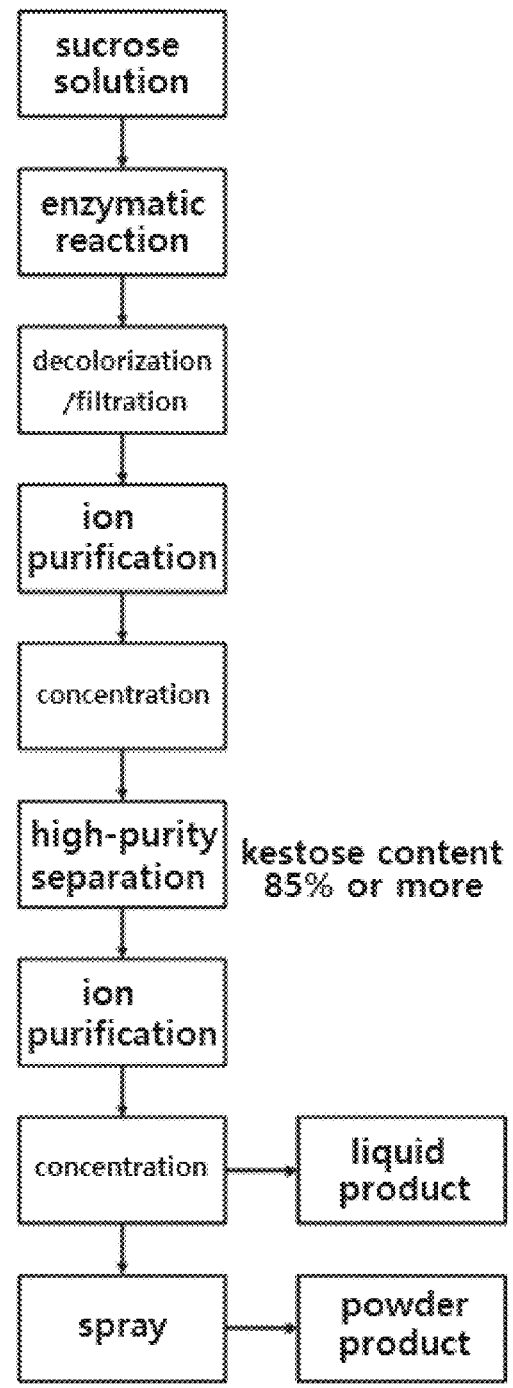

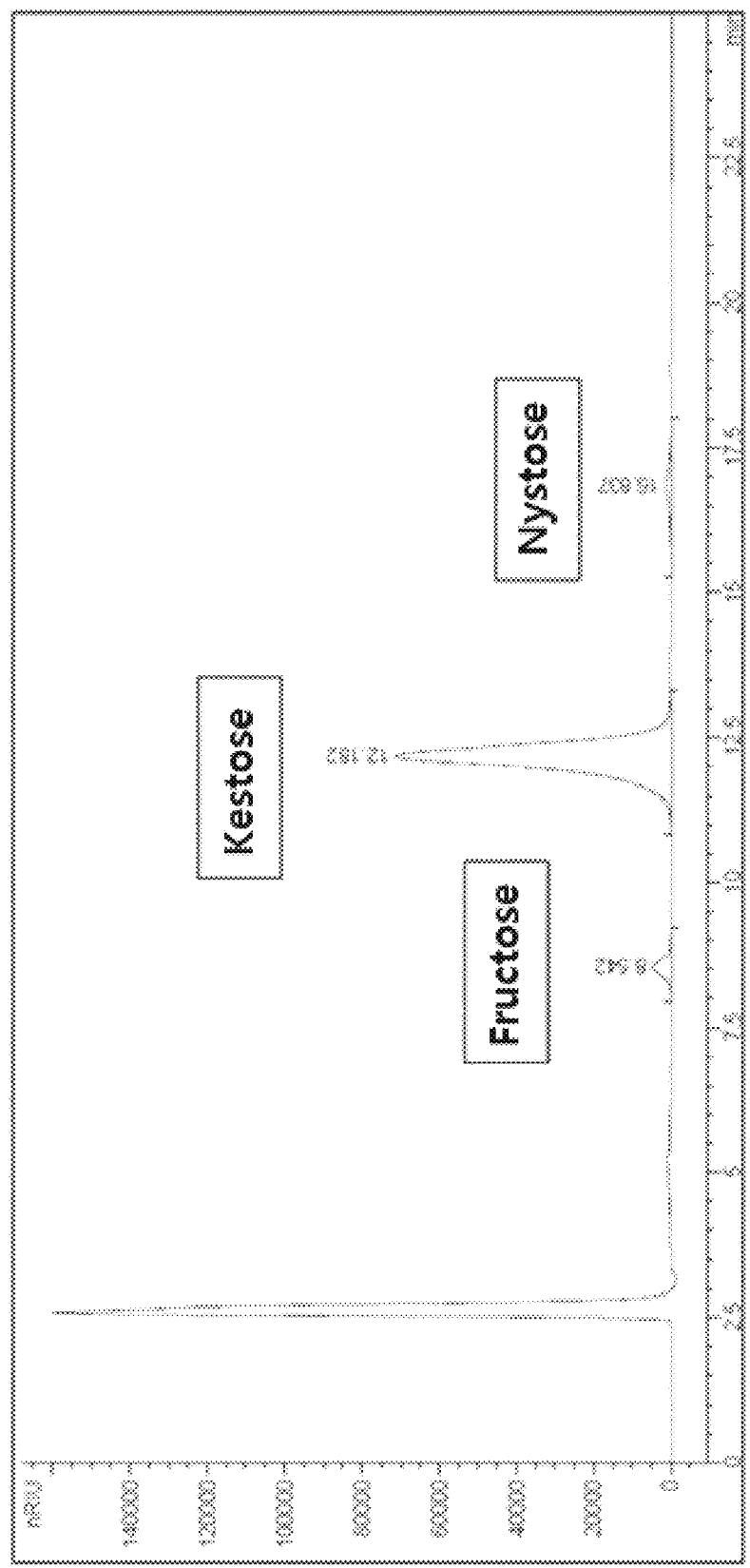
[Fig. 3]

METHOD FOR PREPARING KESTOSE-CONTAINING FRUCTOOLIGOSACCHARIDES

TECHNICAL FIELD

The present invention relates to a method of preparing high-purity kestose-containing fructooligosaccharide with improved storage stability, and more particularly, a method for improving the storage stability of kestose characterized by performing a purification process after preparing high-purity kestose-containing fructooligosaccharide.

BACKGROUND ART

Fructooligosaccharides are oligosaccharides in which one or more fructose are added to sugar in a chain, and the bonding mode is that C2 position of fructose is added C1 position in the fructose residue part of sugar is combined and repeated. As a type of fructooligosaccharide, 1 to 3 molecules of fructose are β-(2>1) bonded to sugar (sucrose), there are 1-kestose (Kestose, GF2), nystose (GF3) and 1-F-fructofuranosylnystose (1-F-Fructosyl nystose, GF4) and the like.

Fructooligosaccharide is a natural substance contained in vegetables, mushrooms or fruits such as banana, onion, asparagus, burdock, garlic, honey, chicory root and the like, and has a long history of intake. Fructooligosaccharide is an ingredient produced from sugar, and its structure is similar to that of sugar, so the physicochemical properties of the two substances are similar. However, unlike sugar, fructooligosaccharide is indigestible, so its physiological properties are very different. In particular, it has been proven that fructooligosaccharide is metabolized by beneficial intestinal bacteria and exhibits various health functions, fructooligosaccharide-containing products are recognized as foods that regulate intestinal conditions and foods that promote the absorption of minerals, and classified as food for specified health use in Japan.

Among fructooligosaccharides, in particular, enhancement action of immunoglobulin A (IgA) antibody and inhibitory action of immunoglobulin E (IgE) antibody production, intestinal bifidobacterial proliferation activity action and improvement of atopic dermatitis in infants of 1-kestose have been confirmed by human tests, and it is industrially required to efficiently produce 1-kestose for use as an allergy suppressing composition, an allergy suppressing food, and an allergy suppressant using 1-kestose.

However, in the case of producing fructooligosaccharide containing a large amount of 1-kestose, nystose (GF3) or 1-F-fructofuranosylnystose (GF4) converted together with 1-kestose are very difficult to separate and purify them as they have similar physical properties to 1-kestose, and for industrially efficient mass production, there is a need for an efficient method for producing 1-kestose by improving an enzyme excessively converting 1-kestose selectively rather than the by-products of nystose or 1-F-fructofuranosylnystose, or a strain having the enzyme.

Fructofuranosidase derived from fungus, an enzyme that produces fructooligosaccharide from sugar, has high transfer activity and low production of isomers, but production selectivity of oligosaccharides is not as high as that of plant-derived sucrose:sucrose fructosyl transferase (SST) that only produces 1-kestose, and only can produce a mixture of oligosaccharides having a polymerization degree of 2 to 6. Therefore, fructooligosaccharides are used as liquids or powders, and since they are amorphous mixtures, there are problems such as high moisture absorption and poor processing suitability compared to crystalline food materials such as sucrose.

There is a technology that can obtain crystalline fructooligosaccharides with a single oligosaccharide component as a main component such as 1-kestose (trisaccharides, GF2) and nystose (tetrasaccharides, GF3) through high-purity saccharide separation and purification, the maximum conversion rate of 1-kestose of the enzyme used for the production of fructooligosaccharides is about 30%, and the reaction product comprises about 25% of nystose as a by-product and about 15% of sugar (sucrose) as a substrate in the reaction product, there is still a need for fructofuranosidase that can be obtained efficiently in order to industrially produce a higher content of 1-kestose. In other words, it is necessary to use fructofuranosidase or a mutant strain required for the production of fructooligosaccharides having high selectivity for 1-kestose production and improved composition of oligosaccharides which are transfer reaction products. In addition, the maximum conversion rate that can be obtained through such a mutant having a high 1-kestose production capacity is about 58% of kestose.

For the improvement effect of atopic dermatitis in infants, one of the functions can be obtained by ingesting 1-kestos, 2.5 g of kestose should be ingested for at least one month based on 100% of kestose. On the other hand, when using kestose 54% syrup (75% by weight) prepared through this enzyme, about 6.14 g should be ingested. Not only it is too large intake for an infant to ingest 6.14 g, but it also has the disadvantage of requiring infants to ingest approximately half of the recommended daily intake of fructooligosaccharide for adults from 2.5 to 15 g. Therefore, it is important to provide a process of separating kestose with high purity, so that it can give the functionality of kestose with minimizing the intake amount of fructooligosaccharide. When separating kestose having a high-purity, high-purity kestose is affected by the content of fructose and nystose in the high-content kestose syrup. Therefore, it is necessary to control the optimal saccharide composition range for separating high-purity kestose from the enzymatic reaction product.

In addition, the pH of fructooligosaccharides is acidified during storage. Fructooligosaccharides are easily decomposed under acidic and heating conditions, and to prevent this, acidity regulators such as organic salts are added to products. When food additives such as acidity regulators are mixed, the type of food must be labeled as other oligosaccharides. In order to improve this, it is necessary to improve the storage stability of the product by partially improving the manufacturing process of the product.

DISCLOSURE

Technical Problem

An object of the present invention is to solve the above-mentioned conventional problems, to produce fructooligosaccharide comprising 1-kestose at a high purity of 85 wt % or more, and to provide an efficient and economical method for producing fructooligosaccharide product comprising kestose at high purity by improving the storage stability of the product.

Technical Solution

The present invention contemplates an optimal saccharide composition range to separate saccharide comprising high-purity kestose by controlling the content of 1-kestose and nystose generated during the conversion reaction and the sugar (sucrose) content of the substrate, and storage stability can be improved through the ion purification process of the separated high-purity kestose-comprising fructooligosaccharides.

The high-purity kestose of the present invention can be prepared using β-fructofuranosidase derived from N/GMO *Aspergillus niger*.

The kestose conversion reaction step of the present invention can selectively produce fructooligosaccharides comprising a high content of 1-kestose, content of nystose and/or fructofuranosylnystose which are impurities is low when obtaining fructooligosaccharide fraction by separating raffinate, and can separate fructooligosaccharide fraction with high kestose content. In this regard, according to the prior art, as nystose (GF3) and/or 1-F-fructofuranosylnystose (GF4) in fructooligosaccharides have similar physical properties to 1-kestose (GF2), there was a problem in that it was very difficult to separate and/or purify 1-kestose from nystose and/or 1-F-fructofuranosylnystose, and the present invention solves the above problems.

In addition, as the kestose-containing fructooligosaccharide prepared according to the preparation method of the present invention has low absorption and crystallinity due to high 1-kestose content and low nystose and 1-F-fructofuranosylnystose contents, it is easy to store and distribute. Moreover, it has excellent effects on the growth of beneficial intestinal bacteria, immunity enhancement, prevention of atopy and prevention of diabetes, so it can be usefully applied as an additive to atopy prevention/immune enhancing food supplements or functional lotions, especially as a functional additive when applied to infant milk products.

Hereinafter, the present invention will be described in more detail.

One embodiment of the present invention provides a method of preparing kestose-containing fructooligosaccharide comprising a step of performing a kestose conversion reaction using a substrate comprising sucrose and an enzyme having kestose conversion activity or a microorganism producing the enzyme.

The kestose conversion reaction step of the present invention can selectively produce fructooligosaccharides comprising a high content of 1-kestose, so that content of nystose and/or fructofuranosylnystose which are impurities is low when obtaining fructooligosaccharide fraction by separating raffinate, and can separate fructooligosaccharide fraction with high kestose content.

The step of performing the kestose conversion reaction is a step of performing kestose conversion reaction to produce kestose, using a substrate comprising sucrose and an enzyme having kestose conversion activity or a microorganism producing the enzyme. At this time, the reaction substrate may comprise sucrose, and one or more selected from the group consisting of fructose, glucose, sucrose, nystose (GF3), and fructofuranosylnystose (GF4) may be additionally generated in addition to kestose, using sucrose as a reaction substrate.

In the step of performing the kestose conversion reaction, it may perform a conversion reaction using a reaction substrate comprising sucrose at 80 to 100% by weight, 80 to 99.99% by weight, 80 to 99.9% by weight, 80 to 99% by weight, 80 to 95% by weight, 80 to 90% by weight, 85 to 100% by weight, 85 to 99.99% by weight, 85 to 99.9% by weight, 85 to 99% by weight, 85 to 95% by weight, 85 to 90% by weight, 90 to 100% by weight, 90 to 99.99% by weight, 90 to 99.9% by weight, 90 to 99% by weight, 90 to 95% by weight, 95 to 100% by weight, 95 to 99.99% by weight, 95 to 99.9% by weight, or 95 to 99% by weight, based on the saccharide solid content of the reaction substrate.

The enzyme having the kestose conversion activity is an enzyme having an activity to convert kestose-containing fructooligosaccharide from a substrate comprising sucrose, and for example, it may be an enzyme derived from one or more selected from the group consisting of *Aspergillus niger* strain, *Pichia farinose* strain, *Yarrowia lipolytica*, *Millerozyma farinose*, and *Aspergillus oryzae* strain. For one example, it may be an *Aspergillus niger* SYG-K1 strain having an accession number KCTC13139BP, or an *Aspergillus niger* SYG-Neo1 strain having an accession number KCTC13140BP.

The microorganism producing the enzyme having the kestose conversion activity may be one or more selected from the group consisting of *Aspergillus niger* strain, *Pichia farinose* strain, *Yarrowia lipolytica*, *Millerozyma farinose*, and *Aspergillus oryzae* strain. For one example, it may be an *Aspergillus niger* SYG-K1 strain having an accession number KCTC13139BP, or an *Aspergillus niger* SYG-Neo1 strain having an accession number KCTC13140BP.

The step of performing the kestose conversion reaction may react at pH condition of pH 6 to 8, and/or temperature condition of 40 to 70° C.

The method of preparing kestose-containing fructooligosaccharide according to one embodiment of the present invention may further comprise a step of terminating the kestose conversion reaction. The kestose conversion reaction is terminated by the step of terminating, and a high purity and high content of kestose-containing fructooligosaccharide reactant can be obtained.

The step of terminating the kestose conversion reaction comprises a step of adjusting to pH 7.6 or higher, pH 7.7 or higher, pH 7.8 or higher, pH 7.9 or higher, or pH 8 or higher, and inactivate the enzyme having kestose conversion activity or the microorganism producing the enzyme.

The step of terminating the kestose conversion reaction comprises a step of heating to a temperature of 75° C. or higher, 76° C. or higher, 77° C. or higher, 78° C. or higher, 79° C. or higher, or 80° C. or higher, and inactivate the enzyme having kestose conversion activity or the microorganism producing the enzyme.

In the step of terminating the kestose conversion reaction, the kestose conversion reaction may be terminated when the sucrose content of the reaction product is 15 to 35% by weight, 15 to 34% by weight, 15 to 33% by weight, 15 to 32% by weight, 15 to 31% by weight, 15 to 30% by weight, 15 to 29% by weight, 15 to 28% by weight, 15 to 27% by weight, 15 to 26% by weight, 15 to 25% by weight, 15 to 24% by weight, 15 to 23% by weight, 15 to 22% by weight, 15 to 21% by weight, 16 to 35% by weight, 16 to 34% by weight, 16 to 33% by weight, 16 to 32% by weight, 16 to 31% by weight, 16 to 30% by weight, 16 to 29% by weight, 16 to 28% by weight, 16 to 27% by weight, 16 to 26% by weight, 16 to 25% by weight, 16 to 24% by weight, 16 to 23% by weight, 16 to 22% by weight, 16 to 21% by weight, 17 to 35% by weight, 17 to 34% by weight, 17 to 33% by weight, 17 to 32% by weight, 17 to 31% by weight, 17 to 30% by weight, 17 to 29% by weight, 17 to 28% by weight, 17 to 27% by weight, 17 to 26% by weight, 17 to 25% by weight, 17 to 24% by weight, 17 to 23% by weight, 17 to 22% by weight, 17 to 21% by weight, 18 to 35% by weight, 18 to 34% by weight, 18 to 33% by weight, 18 to 32% by weight, 18 to 31% by weight, 18 to 30% by weight, 18 to 29% by weight, 18 to 28% by weight, 18 to 27% by weight, 18 to 26% by weight, 18 to 25% by weight, 18 to 24% by weight, 18 to 23% by weight, 18 to 22% by weight, 18 to 21% by weight, 19 to 35% by weight, 19 to 34% by weight, 19 to 33% by weight, 19 to 32% by weight, 19 to 31% by weight, 19 to 30% by weight, 19 to 29% by weight, 19 to 28% by weight, 19 to 27% by weight, 19 to 26% by weight, 19 to 25% by weight, 19 to 24% by weight, 19 to 23% by weight, 19 to 22% by weight, 19 to 21% by weight, 20 to 35% by weight, 20 to 34% by weight, 20 to 33% by weight, 20 to 32% by weight, 20 to 31% by weight, 20 to 30% by weight, 20 to 29% by weight, 20 to 28% by weight, 20 to 27% by weight, 20 to 26% by weight, 20 to 25% by weight, 20 to 24% by weight, 20 to 23% by weight, 20 to 22 by weight %, or 20 to 21% by weight, based on 100% by weight of the saccharide solid content of the reaction product.

In the step of terminating the kestose conversion reaction, the kestose conversion reaction may be terminated when the nystose (GF3) content of the reaction product is 5 wt % or less, less than 5 wt %, 4.5 wt % or less, 4 wt % or less, 3.5 wt % or less, 3 wt % or less, less than 3 wt %, or 2 wt % or less, based on 100 wt % of the saccharide solid content of the reaction product. At this time, even if the lower limit of the nystose content is not specified, a person skilled in the art will be able to appropriately select a time point for terminating the kestose conversion reaction, for example, the lower limit of the nystose content of the reaction product may be 0 wt % or more, more than 0 wt %, 0.01 wt % or more, 0.05 wt % or more, 0.1 wt % or more, 0.5 wt % or more, or 1 wt % or more, but is not limited thereto.

In the step of terminating the kestose conversion reaction, the kestose conversion reaction may be terminated when the kestose (GF2) content of the reaction product is 30 wt % or more, 35 wt % or more, 40 wt % or more, 45 wt % or more, 47 wt % or more, 48 wt % or more, 49 wt % or more, 50 wt % or more, 51 wt % or more, 52 wt % or more, 53 wt % or more, 54 wt % or more, 55 wt % or more, 56 wt % or more, 57 wt % or more, or 58 wt % or more, based on 100 wt % the saccharide solid content of the reaction product. At this time, even if the upper limit of the kestose content is not specified, a person skilled in the art will be able to appropriately select a time point for terminating the kestose conversion reaction, for example, the upper limit of the kestose content of the reaction product may be less than 100 wt %, 99 wt % or less, 98 wt % or less, 97 wt % or less, 96 wt % or less, 95 wt % or less, 90 wt % or less, 85 wt % or less, 80 wt % or less, 70 wt % or less, 65 wt % or less, or 60 wt % or less, but is not limited thereto.

In the step of terminating the kestose conversion reaction, the kestose conversion reaction may be terminated when the glucose content of the reaction product is 25 wt % or less, less than 25 wt %, 24 wt % or less, 23 wt % or less, 22 wt % or less, 21 wt % or less, 20 wt % or less, 19 wt % or less, 18 wt % or less, 17 wt % or less, or 16 wt % or less, based on 100 wt % of the saccharide solid content of the reaction product. At this time, even if the lower limit of the glucose content is not specified, a person skilled in the art will be able to appropriately select a time point for terminating the kestose conversion reaction, for example, the lower limit of the glucose content of the reaction product may be 5 wt % or more, 10 wt % or more, 15 wt % or more, or 16 wt % or more, but is not limited thereto.

In the step of terminating the kestose conversion reaction, the kestose conversion reaction may be terminated when the reaction product comprises 15 to 35 wt % of sucrose and 5 wt % or less of nystose, based on 100 wt % of the saccharide solid content of the reaction product. Alternatively, in the step of terminating the kestose conversion reaction, the kestose conversion reaction may be terminated when the reaction product comprises 20 to 25 wt % of sucrose and 4 wt % or less of nystose, based on 100 wt % of the saccharide solid content of the reaction product.

In the step of terminating the kestose conversion reaction, the kestose conversion reaction may be terminated when the weight percent ratio (%) of nystose (GF3) content compared to the total content of kestose (GF2) and nystose (GF3) of the reaction product is 10% or less, 9% or less, 8% or less, 7% or less, 6.5% or less, 5% or less, 4% or less, or 3.5% or less, based on 100 wt % of the saccharide solid content of the reaction product.

In the step of terminating the kestose conversion reaction, the kestose conversion reaction may be terminated when the weight percent ratio (%) of nystose (GF3) content compared to the total content of kestose (GF2) and nystose (GF3) of the kestose-containing fructooligosaccharide fraction is 15% or less, 14% or less, 13% or less, 12% or less, 11% or less, 10% or less, 9% or less, 8% or less, 7% or less, or 6% or less, based on 100 wt % of the saccharide solid content of the kestose-containing fructooligosaccharide fraction obtained by separating from the kestose conversion reaction product.

The percentage ratio (%) of the nystose (GF3) content to the total content of kestose (GF2) and nystose (GF3) may be calculated by Equation 1.

$$(\text{Nystose wt \%})/\{(\text{Kestose wt \%})+(\text{Nystose wt \%})\} \times 100(\%) \quad \text{[Equation 1]}$$

Before performing the separation step of the reaction product, the reaction product produced by the termination of the kestose conversion reaction goes through one or more selected from the group consisting of a decolorization process decolorizing the conversion reaction product, a filtration process, an ion purification process, and a concentration process, and may obtain a kestose-containing fructooligosaccharide fraction using simulated moving bed (SMB) chromatography.

The method of preparing kestose-containing fructooligosaccharide according to one embodiment of the present invention may further comprise a separation step of obtaining a kestose-containing fructooligosaccharide fraction comprising high-purity of kestose using simulated moving bed (SMB) chromatography. The separation step may be performed as a single process. Alternatively, the separation step may be performed without comprising the concentration step in the previous step.

The SMB chromatography separation process is a separation method that is easy to secure the stability of the material because there is no phase change in the separation process. Among these adsorption separation methods, a chromatography separation method is widely used as a liquid phase absorption separation method. Among them, the simulated moving bed adsorption separation method (SMB) uses multiple columns to continuously separate, so it has superior purity and productivity compared to conventional batch chromatography, and the advantage of using less solvent. The simulated moving bed (SMB) adsorption separation process is a process in which the injection of the mixture to be separated and the production of raffinate and extract are continuously performed.

The basic principle of SMB is to simulate the counter-current flow of the stationary phase and the mobile phase by moving the positions between the columns at regular time intervals and to enable continuous separation. Substances that move quickly because of their weak affinity with the adsorbent move in the flow direction of the liquid phase and collect as extract, and substances that move slowly because of their strong affinity with the adsorbent move in the flow direction of the stationary bed and collect as raffinate. The columns are connected continuously, and the inlet consists of the mixture and mobile phase, and the outlet consists of the target extract and raffinate.

The raffinate is also called extract residual liquid, and the product obtained by passing the raw material input to the separation process through the separation process includes a target fraction containing a target material to be increased in content through the separation process, and residual liquid containing a substance to be removed or reduced in the separation process, and the residual liquid is called raffinate. In one embodiment of the present invention, the product obtained in the kestose conversion reaction process is a mixture comprising sucrose as a raw material substrate and kestose as the product, a fructooligosaccharide fraction with an increased content of kestose which is a target material through a high-purity separation process and residual liquid (raffinate) is obtained, and the residual liquid may contain a reactive substance and a by-product, for example, sucrose, fructose, glucose, nystose, and the like.

Since a cation exchange resin of a strong acid to which salt is added, widely used in the monosaccharide separation process, is used as the separation resin in the SMB, the product obtained after the separation process contains metal ions. Examples of the cation exchange resin of a strong acid may be a cation exchange resin to which sodium, calcium, or potassium active groups are attached.

The separation step of obtaining the kestose-containing fructooligosaccharide fraction may be to isolate a reaction product of a kestose conversion reaction having a high solid content, for example, obtaining the kestose-containing fructooligosaccharide fraction by separating the reaction product having a solid content of 70 to 80 Brix, or 75 to 80 Brix.

In the separation step, fructooligosaccharide fraction comprising 80 wt % or more, 81 wt % or more, 82 wt % or more, 83 wt % or more, 84 wt % or more, 85 wt % or more, 86 wt % or more, 87 wt % or more, 88 wt % or more, 89 wt % or more, 90 wt % or more, or 91 wt % or more of kestose, based on 100 wt % of the saccharide solid content of the fructooligosaccharide fraction, may be obtained. At this time, even if the upper limit of the kestose content of the fructooligosaccharide fraction is not specified, a person skilled in the art can clearly understand under the purpose of obtaining a high-purity kestose-containing fructooligosaccharide fraction, for example, the upper limit of the kestose content of the fructooligosaccharide fraction may be 100 wt % or less, less than 100 wt %, 99.99 wt % or less, 99.9 wt % or less, 99 wt % or less, 98 wt % or less, 97 wt % or less, 96 wt % or less, or 95 wt % or less, but is not limited thereto.

In the separation step, fructooligosaccharide fraction comprising 10 wt % or less, 9 wt % or less, 8 wt % or less, 7 wt % or less, 6 wt % or less, 5 wt % or less, or 4 wt % or less of nystose, based on 100 wt % of the saccharide solid content of the fructooligosaccharide fraction, may be obtained. At this time, even if the lower limit of the nystose content of the fructooligosaccharide fraction is not specified, a person skilled in the art can clearly understand under the purpose of minimizing the nystose content of the fructooligosaccharide fraction, for example, the lower limit of the nystose content of the fructooligosaccharide fraction may be 0 wt % or more, more than 0 wt %, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.1 wt % or more, 1.2 wt % or more, 1.3 wt % or more, 1.4 wt % or more, 1.5 wt % or more, 1.6 wt % or more, 1.7 wt % or more % or more, 1.8 wt % or more, 1.9 wt % or more, 2 wt % or more, 2.5 wt % or more, or 3 wt % or more, but is not limited thereto.

The method of preparing kestose-containing fructooligosaccharide according to one embodiment of the present invention may further comprise a step of ion-purifying the kestose-containing fructooligosaccharide fraction. The ion purification step is a step of ion purifying the fructooligosaccharide fraction obtained in the high-purity separation process using the SMB chromatography. The ion purification step may be performed in one process.

The ion purification step may be performed by passing the fructooligosaccharide fraction through an ion purification column. The ion purification column may comprise an anion column. As an example, the ion purification column may further comprise one or more selected from the group consisting of a cation column and a mixed bed column, and the fructooligosaccharide fraction may pass through the anion column as a final column. In Example 6 of the present application, the effect of the ion purification on the physical properties of the syrup containing high kestose was considered, and when the final column was set as an anion exchange resin column like the ion purification MB-A, the storage stability of the syrup containing high content of kestose was improved. Specifically, more preferably, one embodiment of the method of preparing kestose in the present invention is desirable to increase the pH of the reaction solution by installing A column at the final stage such as K-A column or MB-A, MB-K-A, K-MB-A. This is to prevent decomposition of fructooligosaccharide substances such as kestose and nystose during the manufacturing process.

After the ion purification step, the pH of the fructooligosaccharide fraction may be pH 5 to 8, pH 5 to 7, pH 6 to 8, or pH 6 to 7.

The fructooligosaccharide prepared by the method of preparing kestose-containing fructooligosaccharide according to one embodiment of the present invention may preferably have improved storage stability. For example, the fructooligosaccharide content of the kestose-containing fructooligosaccharide may be 30% or more, 40% or more, 50% or more, 60% or more, 70% or more, 80% or more, 90% or more, 91% or more, 92% or more, 93% or more, 94% or more, or 95% or more of the fructooligosaccharide content measured immediately after the preparation of the fructooligosaccharide fraction. The fructooligosaccharide content of the kestose-containing fructooligosaccharide may be the fructooligosaccharide content after storage for 1 week, 2 weeks, 3 weeks, 4 weeks, 5 weeks, 6 weeks, or 7 weeks. Specifically, the kestose-containing fructooligosaccharide is stable, in that the fructooligosaccharide content after 1 week, 2 weeks, 3 weeks, 4 weeks, 5 weeks, 6 weeks, or 7 weeks of manufacture may be preserved 30% or more, 40% or more, 50% or more, 60% or more, 70% or more, 80% or more, 90% or more, 91% or more, 92% or more, 93% or more, 94% or more, or 95% or more of the initial fructooligosaccharide content.

Alternatively, the pH of the kestose-containing fructooligosaccharide after storage for 7 weeks may be pH 3.5 to 8, pH 3.5 to 7, pH 3.5 to 6, pH 3.5 to 5.5, pH 3.5 to 5, pH 4 to 8, pH 4 to 7, pH 4 to 6, pH 4 to 5.5, pH 4 to 5, pH 4.5 to 8, pH 4.5 to 7, pH 4.5 to 6, pH 4.5 to 5.5, or pH 4.5 to 5. At this time, the kestose-containing fructooligosaccharide may be stored at a temperature of 30 to 50° C., 30 to 45° C., 35 to 50° C., 35 to 45° C., 40 to 50° C., or 40 to 45° C., for one example, 45° C.

Specifically, using an aqueous solution of sucrose with a concentration of 55 wt % as a substrate, after heating to a temperature of 40 to 70° C., for example, 55° C., and adjusting to pH 6 to 8, for example, pH 6.5 to 7.0, β-fructofuranosidase is added to carry out an enzymatic reaction.

Then, when the kestose content is produced 30% by weight or more, the pH is adjusted to 7.6 or more, for example, pH 8.0, and then heated at 75° C. or more, for example, 80° C. for 2 hours to inactivate the enzyme. Before performing the separation step of the reaction product of the kestose conversion reaction, it may further comprise a step of treating one or more process selected from the group consisting of a decolorization process, an ion purification process, and a concentration process.

For example, for the reaction product of the kestose conversion reaction, a filtration process (decolorization process) in which the activated carbon is treated with 0.5% to 1.0% of the solid content to remove impurities and lower the color value may be performed. After the filtration process, ion purification can be carried out, and the general ion purification process K (cation exchange resin)-A (anion exchange resin)-MB (Mixed Bed: K:A=1:2) may be passed, more preferably, in one embodiment of the method of preparing kestose of the present invention, it is preferable to increase the pH of the reaction solution by installing A column at the end like K-A column or MB-A, MB-K-A, K-MB-A. This is to prevent decomposition of fructooligosaccharide substances such as kestose and nystose during the manufacturing process. Thereafter, the Brix can be adjusted to 70 to 80 wt % through concentration.

After the above process, a separation process using a simulated moving bed (SMB) which is a chromatography high-purity separation process is performed to separate kestose with high purity. In this case, the resin used may be $Na^+$ type or $Ca^{2+}$ type resin. The content of separated kestose may comprise 80 wt % or more, for example, 85 to 95 wt % of kestose (GF2) based on 100% of the saccharide solid content of the fructooligosaccharide fraction. The high-purity separated kestose can be subjected to an ion purification process again, and specifically, high-purity kestose obtained through SMB passes through the purification column of A, MB-A, K-MB-A, K-A, MB-K-A, and the like, to produce the purified product having a pH of 5.0 to 8.0. The ion purification process is performed for improving storage stability after production of products. Thereafter, it is concentrated to 75 wt % through a concentration process and discharged as a product. Depending on the situation, if necessary, powder can be manufactured using Spray Dry or Conveyor Vacuum Dry.

Effect of the Invention

According to the present invention, it is possible to provide a method of preparing with improved productivity and efficiency by establishing the content range of sucrose, kestose, and nystose for high-purity kestose separation during the kestose conversion reaction process during the manufacturing process of the method of preparing the high-purity kestose, and by improving the ion purification.

BRIEF DESCRIPTION OF DRAWINGS

FIG. 1 is a diagram illustrating an embodiment of a general SMB process.

FIG. 2 is a schematic diagram of a kestose manufacturing process according to an embodiment of the present invention.

FIG. 3 is an HPLC analysis result of a high-purity kestose fraction obtained after high-purity separation through SMB chromatography.

MODE OF THE INVENTION

The present invention will be described in more detail with the following examples. However, the following examples are only preferable examples of the present invention, and the present invention is not intended to be limited thereto.

Comparative Example 1: Preparation of Fructooligosaccharide Syrup

After 45 tons of water heated to 55° C. was put into saccharification tank, 55 tons of sucrose was added and the sucrose crystals were completely dissolved by stirring for 1 to 2 hours. After adjusting pH to 6.5 to 7.0, β-fructofuranosidase derived from microorganisms of *Aspergillus* genus or *Fusarium* genus which was a conventional enzyme producing fructooligosaccharide was added and reacted for 24 to 48 hours at a temperature of 50 to 60° C.

After the reaction was completed, the enzyme was inactivated by adjusting to pH 7.6 or higher using 4N NaOH and heating to 80° C. for 2 hours at the same time. At the time when the inactivation of enzyme was completed, the enzyme reaction product was prepared by adjusting the solid content to 75% by weight through decolorization/filtration, purification, and concentration. Table 1 shows the saccharide composition of Comparative sample 1-A of the prepared syrup.

Thereafter, high-purity separation was performed using SMB filled with Na type separation resin. Table 1 shows the saccharide composition of the obtained syrup Comparative sample 1-B after high-purity separation by liquid chromatography (HPLC) under the following analysis conditions. The kestose content after high-purity separation was about 34% by weight. Therefore, it was confirmed that it is difficult to produce high-purity kestose with conventional fructooligosaccharide producing enzymes which are generally used.

<Analysis Conditions>
Column: Shodex Asahipak BH2P-50 4E
Injection volume: 10 ul
Flow rate: 1 ml/min
Column temperature: 30° C.
Mobile phase: Acetonitrile 70%

TABLE 1

| Saccharide composition (wt %) | fructose | glucose | sucrose | GF2 | GF3 | GF4 | FOS |
|---|---|---|---|---|---|---|---|
| Comparative sample 1-A | 5.44 | 25.82 | 13.47 | 26.76 | 25.12 | 3.39 | 55.27 |
| Comparative sample 1-B | 0.30 | 0.36 | 2.81 | 33.81 | 51.6 | 11.12 | 96.53 |

Example 1: Preparation of High-Kestose Syrup (1)

After 45 kg of water heated to 55° C. was put into saccharification tank, 55 kg of sucrose was added and the sucrose crystals were completely dissolved by stirring for 1 to 2 hours. After adjusting pH to 6.5 to 7.0, β-fructofuranosidase derived from *Aspergillus niger* of accession number KCTC 13139BP which is an enzyme for preparing high-kestose syrup was added and reacted for 24 to 48 hours at a temperature of 50 to 60° C.

At this time, inactivation of enzyme was induced at the enzyme reaction section where the sucrose content remained 34% by weight, by adjusting to pH 7.6 or higher using 4N NaOH and heating at 80° C. for 2 hours at the same time. At the time when the inactivation of enzyme was completed, the enzyme reaction product was prepared to 75% by weight through decolorization/filtration, purification, and concentration. Table 2 shows the saccharide composition of the prepared syrup Test sample 1-1.

Thereafter, high-purity separation was performed using SMB filled with Na$^+$ type separation resin. After the enzymatic reaction, the saccharide composition of Test sample 1-2 obtained after high-purity separation was analyzed using liquid chromatography (HPLC) under the same conditions as in Comparative Example 1, and is shown in Table 2. Kestose after high-purity separation was about 81% by weight. Therefore, it confirmed that in order to separate kestose more than 85%, it was difficult if the sucrose content of crude solution to be separated was higher than 34% by weight.

TABLE 2

| Saccharide composition (%) | fructose | glucose | sucrose | GF2 | GF3 | GF4 | FOS |
| --- | --- | --- | --- | --- | --- | --- | --- |
| Test sample 1-1 | 1.02 | 15.13 | 34.84 | 47.43 | 1.58 | 0.0 | 49.01 |
| Test sample 1-2 | 0.11 | 0.0 | 13.83 | 81.25 | 3.81 | 0 | 86.06 |

Example 2: Preparation of High-Kestose Syrup (2)

After 45 kg of water heated to 55° C. was put into the saccharification tank, 55 kg of sucrose was added and the sucrose crystals were completely dissolved by stirring for 1 to 2 hours. After adjusting pH to 6.5 to 7.0, β-fructofuranosidase derived from *Aspergillus niger*, the same as Example 1, which is an enzyme for preparing high-kestose syrup, was added and reacted for 24 to 48 hours at a temperature of 50 to 60° C.

At this time, inactivation of enzyme was induced at the enzyme reaction section where the sucrose content remained 30% by weight, by adjusting to pH 7.6 or higher using 4N NaOH and heating at 80° C. for 2 hours at the same time. At the time when the inactivation of enzyme was completed, the enzyme reaction product was prepared to 75% by weight through decolorization/filtration, purification, and concentration. Table 3 shows the saccharide composition of the prepared syrup Test sample 2-1.

Thereafter, high-purity separation was performed using SMB filled with Na$^+$ type separation resin. After the enzymatic reaction, the saccharide composition of Test sample 2-2 obtained after high-purity separation was analyzed using liquid chromatography (HPLC) under the same conditions as in Comparative Example 1, and is shown in Table 3. Kestose after high-purity separation was about 85% by weight. In order to separate more than 85% of kestose, it was confirmed that the sucrose content of crude solution to be separated should be 30% by weight or less.

TABLE 3

| saccharide composition (%) | fructose | glucose | sucrose | GF2 | GF3 | GF4 | FOS |
| --- | --- | --- | --- | --- | --- | --- | --- |
| Test sample 2-1 | 0.99 | 16.53 | 30.0 | 50.80 | 1.68 | 0.0 | 52.17 |
| Test sample 2-2 | 0.15 | 0.0 | 9.61 | 85.12 | 5.12 | 0 | 90.24 |

Example 3: Preparation of High-Kestose Syrup (3)

After 45 kg of water heated to 55° C. was put into the saccharification tank, 55 kg of sucrose was added and the sucrose crystals were completely dissolved by stirring for 1 to 2 hours. After adjusting pH to 6.5 to 7.0, β-fructofuranosidase derived from *Aspergillus niger*, the same as Example 1, which is an enzyme for preparing high-kestose syrup, was added and reacted for 24 to 48 hours at a temperature of 50 to 60° C.

At this time, inactivation of enzyme was induced at the enzyme reaction section where the sucrose content remained 26% by weight, by adjusting to pH 7.6 or higher using 4N NaOH and heating at 80° C. for 2 hours at the same time. At the time when the inactivation of enzyme was completed, the enzyme reaction product was prepared to 75% by weight through decolorization/filtration, purification, and concentration. Table 4 shows the saccharide composition of the prepared syrup Test sample 3-1.

Thereafter, high-purity separation was performed using SMB filled with $Na^+$ type separation resin. After the enzymatic reaction, the saccharide composition of Test sample 3-2 obtained after high-purity separation was analyzed using liquid chromatography (HPLC) under the same conditions as in Comparative Example 1, and is shown in Table 4. Kestose after high-purity separation was about 88% by weight. In order to separate more than 85% of kestose, for example, 88% by weight or more, it was confirmed that the sucrose content of crude solution to be separated should be 30% by weight or less.

TABLE 4

| Saccharide composition (%) | fructose | glucose | sucrose | GF2 | GF3 | GF4 | FOS |
|---|---|---|---|---|---|---|---|
| Test sample 3-1 | 0.63 | 17.75 | 26.34 | 53.54 | 1.74 | 0.0 | 55.28 |
| Test sample 3-2 | 0.11 | 0.0 | 5.45 | 88.53 | 5.91 | 0 | 94.44 |

Example 4: Preparation of High-Kestose Syrup (4)

After 45 kg of water heated to 55° C. was put into the saccharification tank, 55 kg of sucrose was added and the sucrose crystals were completely dissolved by stirring for 1 to 2 hours. After adjusting pH to 6.5 to 7.0, β-fructofuranosidase derived from *Aspergillus niger*, the same as Example 1, which is an enzyme for preparing high-kestose syrup, was added and reacted for 24 to 48 hours at a temperature of 50 to 60° C.

At this time, inactivation of enzyme was induced at the enzyme reaction section where the sucrose content remained 20% by weight, by adjusting to pH 7.6 or higher using 4N NaOH and heating at 80° C. for 2 hours at the same time. At the time when the inactivation of enzyme was completed, the enzyme reaction product was prepared to 75% by weight through decolorization/filtration, purification, and concentration. Table 5 shows the saccharide composition of the prepared syrup Test sample 4-1.

Thereafter, high-purity separation was performed using SMB filled with $Na^+$ type separation resin. After the enzymatic reaction, the saccharide composition of the Test sample 4-2 obtained after high-purity separation was analyzed using liquid chromatography (HPLC) under the same conditions as in Comparative Example 1, and is shown in Table 5. Kestose after high-purity separation was about 91% by weight. In order to separate more than 90% of kestose, it was confirmed that the sucrose content of crude solution to be separated should be 25% by weight or less.

TABLE 5

| Saccharide composition (%) | fructose | glucose | sucrose | GF2 | GF3 | GF4 | FOS |
|---|---|---|---|---|---|---|---|
| Test sample 4-1 | 1.05 | 18.83 | 20.72 | 56.48 | 2.91 | 0.0 | 59.39 |
| Test sample 4-2 | 0.0 | 0.0 | 1.88 | 91.25 | 6.87 | 0 | 98.12 |

Example 5: Preparation of High-Kestose Syrup (5)

After 45 kg of water heated to 55° C. was put into the saccharification tank, 55 kg of sucrose was added and the sucrose crystals were completely dissolved by stirring for 1 to 2 hours. After adjusting pH to 6.5 to 7.0, β-fructofuranosidase derived from *Aspergillus niger*, the same as Example 1, which is an enzyme for preparing high-kestose syrup, was added and reacted for 24 to 48 hours at a temperature of 50 to 60° C.

At this time, inactivation of enzyme was induced at the enzyme reaction section where the sucrose content remained 15% by weight, by adjusting to pH 7.6 or higher using 4N NaOH and heating at 80° C. for 2 hours at the same time. At the time when the inactivation of enzyme was completed, the enzyme reaction product was prepared to 75% by weight through decolorization/filtration, purification, and concentration. Table 6 shows the saccharide composition of the prepared syrup Test sample 5-1.

Thereafter, high-purity separation was performed using SMB filled with $Na^+$ type separation resin. After the enzymatic reaction, the saccharide composition of the Test sample 5-2 obtained after high-purity separation was analyzed using liquid chromatography (HPLC) under the same conditions as in Comparative Example 1, and is shown in Table 6. Kestose after high-purity separation was about 88% by weight. In order to separate more than 85% of kestose, it was confirmed that there is no problem in the range of about 15% by weight of the sucrose content of the crude solution to be separated, but the increase in the content of nystose (GF3) affects the separation of high-purity kestose. Therefore, in addition to sucrose, nystose (GF3) content also affects the separation of kestose, and in order to separate more than 90% of kestose, it was considered that it would be more preferable to manage GF3 at 5% or less after the enzymatic reaction.

TABLE 6

| Saccharide composition (%) | fructose | glucose | sucrose | GF2 | GF3 | GF4 | FOS |
|---|---|---|---|---|---|---|---|
| Test sample 5-1 | 1.15 | 20.93 | 15.29 | 58.29 | 4.34 | 0.0 | 62.63 |
| Test sample 5-2 | 0.0 | 0.0 | 1.25 | 88.63 | 10.12 | 0 | 96.75 |

Example 6: Ion Purification of High-Purity Kestose

In order to examine the effect of the ion purification on the physical properties of the high-kestose syrup, some of the high-kestose syrups obtained after high-purity separation in Examples 1 to 5 were taken and ion-purified by dividing into MB-A or A-MB. Thereafter, it was concentrated to 75 Brix through a concentration process, and measurements were made at weeks 1, 2, 3, 4, 5, 6, and 7, respectively, under severe conditions at 45° C. To analyze the content of fructooligosaccharides, the saccharide composition was analyzed using liquid chromatography, and shown in Table 7. In addition, the product was diluted to 30Bx and the pH of the product was analyzed using a pH meter and shown in Table 8.

TABLE 7

| Storage week | Test sample 1-2 | | Test sample 2-2 | | Test sample 3-2 | | Test sample 4-2 | | Test sample 5-2 | |
|---|---|---|---|---|---|---|---|---|---|---|
| — | A-MB | MB-A | A-MB | MB-A | A-MB | MB-A | A-MB | MB-A | A-MB | MB-A |
| 0 | 86.06 | 86.06 | 90.24 | 90.24 | 94.44 | 94.44 | 98.12 | 98.12 | 96.75 | 96.75 |
| 1 | 83.12 | 86.03 | 87.65 | 90.21 | 90.56 | 94.40 | 94.51 | 98.06 | 93.66 | 96.71 |
| 2 | 80.63 | 86.01 | 83.58 | 90.18 | 86.14 | 94.38 | 90.32 | 98.01 | 89.41 | 96.65 |
| 3 | 68.22 | 85.00 | 77.32 | 90.06 | 78.05 | 94.06 | 83.65 | 97.56 | 80.62 | 96.34 |
| 4 | 57.63 | 84.16 | 65.82 | 89.64 | 69.54 | 93.02 | 72.41 | 96.66 | 69.66 | 95.64 |
| 5 | 46.82 | 83.51 | 51.27 | 88.74 | 57.56 | 91.86 | 60.32 | 95.53 | 58.96 | 94.53 |
| 6 | 34.52 | 82.86 | 38.68 | 87.52 | 43.43 | 90.91 | 45.63 | 94.46 | 43.75 | 93.46 |
| 7 | 25.40 | 82.45 | 24.80 | 86.12 | 26.50 | 89.66 | 27.30 | 93.54 | 27.94 | 92.21 |
| 7 week/0 week | 29.5% | 95.8% | 27.5% | 95.4% | 28.1% | 94.9% | 27.8% | 95.3% | 28.9% | 95.3% |

TABLE 8

| Storage week | Test sample 1-2 | | Test sample 2-2 | | Test sample 3-2 | | Test sample 4-2 | | Test sample 5-2 | |
|---|---|---|---|---|---|---|---|---|---|---|
| — | A-MB | MB-A | A-MB | MB-A | A-MB | MB-A | A-MB | MB-A | A-MB | MB-A |
| 0 | 4.52 | 6.91 | 4.48 | 6.89 | 4.61 | 6.92 | 4.49 | 6.97 | 4.57 | 6.85 |
| 1 | 4.38 | 6.47 | 4.32 | 6.41 | 4.44 | 6.55 | 4.38 | 6.61 | 4.32 | 6.42 |
| 2 | 4.21 | 6.13 | 4.21 | 6.04 | 4.28 | 6.11 | 4.24 | 6.23 | 4.16 | 6.19 |
| 3 | 4.14 | 5.97 | 4.04 | 5.82 | 4.16 | 5.92 | 4.11 | 6.02 | 4.05 | 5.95 |
| 4 | 3.78 | 5.67 | 3.82 | 5.58 | 3.83 | 5.58 | 3.76 | 5.68 | 3.94 | 5.61 |
| 5 | 3.56 | 5.31 | 3.49 | 5.24 | 3.52 | 5.26 | 3.48 | 5.31 | 3.86 | 5.22 |
| 6 | 3.41 | 5.06 | 3.37 | 4.91 | 3.39 | 4.89 | 3.36 | 5.02 | 3.45 | 4.98 |
| 7 | 3.28 | 4.81 | 3.22 | 4.68 | 3.14 | 4.75 | 3.21 | 4.80 | 3.34 | 4.73 |

As can be seen from Tables 7 and 8, it was confirmed that the storage stability of the product was improved when the final column was set as an anion resin column like MB-A, and the decomposition of fructooligosaccharides was rapid when produced by the conventional method.

The invention claimed is:

1. A method of preparing a stable kestose-containing fructooligosaccharide, comprising
   a step of performing a kestose conversion reaction using a substrate comprising sucrose and an enzyme having kestose conversion activity or a microorganism producing the enzyme;
   a step of terminating the kestose conversion reaction to obtain the reaction product of the kestose conversion reaction;
   a separation step of obtaining a kestose-containing fructooligosaccharide fraction from the reaction product of the kestose conversion reaction using simulated moving bed (SMB) chromatography, wherein the fraction comprises 80 wt % or more of kestose (GF2) based on 100 wt % of the saccharide solid content of the fraction, and
   a step of ion-purification performed by passing the kestose-containing fructooligosaccharide fraction through an ion purification column comprising a mixed bed column followed by completing with an anion exchange resin column, to obtain a stable kestose-containing fructooligosaccharide,
   wherein pH of the stable kestose-containing fructooligosaccharide is in the range of pH 5 to 8,
   wherein the step of terminating the kestose conversion reaction is performed when the sucrose content is 15 to 35 wt % and a nystose content is 0.01 to 5 wt % based on 100 wt % of the saccharide solid content of the reaction product, and
   wherein the stable kestose-containing fructooligosaccharide has a property of pH of 3.5 to 8 after storage at 45° C. for 7 weeks.

2. The method according to claim 1, wherein the step of performing a kestose conversion reaction is performed by using a substrate comprising 80 to 100 wt % of sucrose based on the saccharide solid content of the substrate comprising the sucrose.

3. The method according to claim 1, wherein the separating step is to obtain a fructooligosaccharide fraction comprising 90 wt % or more of kestose (GF2) based on 100 wt % of the saccharide solid content of the fructooligosaccharide fraction.

4. The method according to claim 1, wherein the separating step is to obtain a fructooligosaccharide fraction comprising 10 wt % or less of nystose (GF3) based on 100 wt % of the saccharide solid content of the kestose-containing fructooligosaccharide fraction.

5. The method according to claim 1, wherein the step of terminating the kestose conversion reaction is to produce the reaction product comprising 15 to 35 wt % of sucrose, 30 to 60 wt % of kestose, and 0.01 to 5 wt % of nystose, based on the saccharide solid content of the reaction product.

6. The method according to claim 5, wherein the step of terminating the kestose conversion reaction is to produce an enzyme reaction product comprising less than 25 wt % of glucose based on 100% saccharide solid content of the reaction product.

7. The method according to claim 1, wherein the separation step is applied to the kestose conversion reaction product having a solid content of 70 to 80 Brix.

8. The method according to claim 1, wherein the step of terminating the kestose conversion reaction is to terminate the kestose conversion reaction when the weight percent ratio (%) of the nystose (GF3) content to the total content of kestose (GF2) and nystose (GF2) of the reaction product calculated by Equation 1 below is 10% or less, based on 100 wt % of the saccharide solid content of the reaction product:

$$\frac{\text{Nystose weight \%}}{\text{(Kestose weight \%)} + \text{(Nystose weight \%)}} \times 100(\%). \quad \text{[Equation 1]}$$

9. The method according to claim 1, wherein the step of terminating the kestose conversion reaction is to terminate the kestose conversion reaction so that the weight percent ratio (%) of the nystose (GF3) content to the total content of kestose (GF2) and nystose (GF2) of the kestose-containing frauctooligosachcaride fraction calculated by Equation 1 below is 15% or less, based on 100 wt % of the saccharide solid content of the kestose-containing fructooligosaccharide fraction obtained by separating from the reaction product of the kestose conversion reaction:

$$\frac{\text{Nystose weight \%}}{\text{(Kestose weight \%)} + \text{(Nystose weight \%)}} \times 100(\%). \quad \text{[Equation 1]}$$

10. The method according to claim 1, wherein the fructooligosaccharide content of the stable kestose-containing fructooligosaccharide is 30% or more of the fructooligosaccharide content.

11. The method according to claim 1, wherein the step of performing the kestose conversion reaction is carried out at pH 6 to 8 and a temperature of 40 to 70° C.

12. The method according to claim 1, wherein the step of terminating the kestose conversion reaction comprises one or more selected from the group consisting of a step of adjusting a reaction pH to 7.6 or higher, and a step of setting a reaction temperature to 75° C. or higher.

13. The method according to claim 1, wherein further comprising a step of treating one or more process selected from the group consisting of decolorization process, an ion purification process, and a concentration process, before performing the separation step of the reaction product of the kestose conversion reaction.

14. The method according to claim 1, wherein the enzyme having kestose conversion activity is an enzyme derived from one or more selected from the group consisting of *Aspergillus niger* strain, *Pichia* farinose strain, *Yarrowia lipolytica, Millerozyma farinose*, and *Aspergillus oryzae*.

\* \* \* \* \*